(12) United States Patent
Orofino (10) Patent No.: US 12,239,259 B2
(45) Date of Patent: Mar. 4, 2025

(54) PRE-PACKAGED LIQUID CONTAINER AND CORRESPONDING DEVICE

(71) Applicant: OROFINO PHARMACEUTICALS GROUP S.R.L., Rome (IT)

(72) Inventor: Ernesto Orofino, Rome (IT)

(73) Assignee: OROFINO PHARMACEUTICALS GROUP S.R.L., Rome (IT)

( * ) Notice: Subject to any disclaimer, the term of this patent is extended or adjusted under 35 U.S.C. 154(b) by 0 days.

(21) Appl. No.: 18/002,028

(22) PCT Filed: Jun. 7, 2021

(86) PCT No.: PCT/IB2021/054971
§ 371 (c)(1),
(2) Date: Dec. 15, 2022

(87) PCT Pub. No.: WO2021/255575
PCT Pub. Date: Dec. 23, 2021

(65) Prior Publication Data
US 2023/0240475 A1 Aug. 3, 2023

(30) Foreign Application Priority Data
Jun. 19, 2020 (IT) .................. 102020000014743

(51) Int. Cl.
B65D 81/32 (2006.01)
A47J 41/00 (2006.01)
B65D 85/72 (2006.01)

(52) U.S. Cl.
CPC ....... *A47J 41/0038* (2013.01); *B65D 81/3211* (2013.01); *B65D 85/72* (2013.01)

(58) Field of Classification Search
CPC .......................... B65D 81/3211; B65D 81/32; B65D 81/3205; B65D 85/72
(Continued)

(56) References Cited

U.S. PATENT DOCUMENTS 5,379,909 A * 1/1995 Roark .................. B65D 81/365
220/756
5,397,031 A 3/1995 Jensen
(Continued)

FOREIGN PATENT DOCUMENTS

EP 0293290 A 11/1988
EP 3095728 A1 11/2016
(Continued)

OTHER PUBLICATIONS

International Search Report, issued in PCT/IB2021/054971, mailed Oct. 15, 2021, Rijswijk, NL.

*Primary Examiner* — Rafael A Ortiz
(74) *Attorney, Agent, or Firm* — Valauskas Corder LLC (57) ABSTRACT

A pre-packaged liquid container usable in a device for administering liquid has a container upper portion containing a basic liquid, with a container upper wall extending from a first container upper portion base to a second container upper portion base having a mechanically breakable container upper portion membrane, the container upper wall having a container upper portion thread, and a container lower portion containing a powder soluble in the basic liquid, with a container lower wall extending from a first container lower portion base to a second container lower portion base. The container lower wall has a container lower portion thread. The first container lower portion base has a mechanically breakable container lower portion membrane. Coupling and closing means of the container upper and lower portions have a first thread engaging with the container upper portion thread, a second thread engaging with the container lower portion thread, and breaking means for breaking the container lower and upper portion membranes.

3 Claims, 5 Drawing Sheets

(58) Field of Classification Search
USPC .................................... 220/592.17; 206/222
See application file for complete search history.

(56) References Cited

U.S. PATENT DOCUMENTS

| | | | | |
|---|---|---|---|---|
| 9,004,302 | B2 * | 4/2015 | Ginzburg | ............... B65B 3/04 |
| | | | | 206/0.5 |
| 2007/0039975 | A1 * | 2/2007 | Bochtler | ............ B65D 71/502 |
| | | | | 222/61 |
| 2008/0179325 | A1 * | 7/2008 | Clarke | ............. B60K 15/0406 |
| | | | | 220/202 |
| 2012/0211459 | A1 * | 8/2012 | Ginzburg | ............... B65B 3/04 |
| | | | | 215/349 |
| 2014/0238949 | A1 * | 8/2014 | Patel | ..................... B65D 1/04 |
| | | | | 215/6 |
| 2015/0027913 | A1 * | 1/2015 | P. J. | ................ B65D 81/3211 |
| | | | | 53/428 |

FOREIGN PATENT DOCUMENTS

| | | | | |
|---|---|---|---|---|
| ES | 2747268 | T3 * | 3/2020 | ............ B65D 71/502 |
| FR | 2532280 | A1 | 3/1984 | |
| WO | 2004054414 | A1 | 7/2004 | |
| WO | 2016202465 | A2 | 12/2016 | |
| WO | WO-2019207332 | A1 * | 10/2019 | ............ B29C 51/268 |
| WO | 2019224762 | A1 | 11/2019 | |

\* cited by examiner

PRE-PACKAGED LIQUID CONTAINER AND CORRESPONDING DEVICE

CROSS-REFERENCE TO RELATED APPLICATIONS

This application is a U.S. National Phase filing of PCT International Patent Application No. PCT/IB2021/054971, having an international filing date of Jun. 7, 2021, which claims priority to Italian Patent Application No. 102020000014743, filed Jun. 19, 2020 each of which is hereby incorporated by reference in its entirety.

FIELD OF THE INVENTION

The present invention relates to the field of systems for regulating the temperature of a liquid suitable for oral administration, as well as systems for the oral administration of liquids.

BACKGROUND ART

It is known that in recent decades baby bottles have not undergone a remarkable typological and technological evolution, but almost exclusively an evolution in terms of pure aesthetics and shape.

There are currently several families of baby bottles on the market, which mainly differ for place of use and method of use, without prejudice to the lack of technological innovation.

In particular, even within the same family, the baby bottles differ in the choice of materials, chromatic choice and design choice, it being understood that the shape of the nipple remains the original one in almost all cases.

It is also known that, during administration, the baby bottles are subjected to different temperatures of the liquid, which change mainly according to the features of the recipient to whom the liquid is administered, in particular the age and psycho-physical condition of the recipient.

Such temperatures are currently managed by devices external to the baby bottle, which transmit the heat corresponding to the desired temperature, substantially transferring it to the liquid in question.

In particular, such types of liquid heating are used through heated plates or by immersing the baby bottle within a liquid corresponding to the desired temperature.

It is also known that the liquids are introduced manually and dosed upon insertion into the baby bottle.

These modes are impractical and do not allow satisfactorily and accurately regulating the temperature.

Patent document U.S. Pat. No. 5,397,031 describes a device for heating the water to be introduced into a baby bottle. It includes a housing for holding a water bottle overturned and a heater for heating a predetermined amount of water. There is a flexible tube for the interconnection between the bottle and the heater and a dosing valve is inserted between the bottle and the heater, allowing the preselected amount of water to enter the heater. A sensor is arranged inside the flexible tube upstream of the dosing valve for detecting the temperature of the water entering the dosing valve itself. A control system, responsive to a manual switch to set said predefined amount of water, is provided to operate the heater for a time sufficient to heat said predefined amount of water to a desired temperature. No means are included for sucking the liquid, as this must be poured into the baby bottle where the powdered milk is also introduced. The water temperature detected is therefore not the final temperature of the milk administered, which is created in the baby bottle and only after it has been administered. Furthermore, the bottle must be opened before connecting it to the device according to the invention, and it is possible to connect it only with the opening upwards, in order not to spill a part of the water. Therefore, the device of patent document U.S. Pat. No. 5,397,031 is not a heated baby bottle and does not appear to be sufficiently sterile, as it is not really different from water heated in a kettle and then inserted into the bottle.

A heated baby bottle is known from WO 2004/054414, where heating means are inserted in a standard baby bottle between teat and container body. Also in this case there are problems of sterility, since the body of the baby bottle must be filled with milk, then the heating module and finally the suction means must be coupled. Furthermore, it must be disassembled into three parts which must be individually sanitized before the next use, making such a solution very impractical as well as not sterile.

The device of international application WO2019224762 in the name of the present Applicant is also known, which uses a pre-packaged liquid container, in which however the pre-packaged liquid container does not ensure a sufficient conservation of the liquid and the heating system of the liquid is not efficient.

Furthermore:

FR2532280 A1 and EP0293290 A1 disclose a package consisting of two containers locked by caps or membranes and a device which allows perforating the caps or membranes. The device ensures the mechanical connection between the containers and connects the respective contents thereof together;

EP3095728 A1 discloses a connection device of two parts which must be rejoined to form a container of a liquid to be administered. The rejoining occurs by screwing a connection device with the two opposite parts, perforating the membranes.

However, such devices of the known art have means for connecting the two parts which work only by screwing. In particular, the last document cited provides a screwing locking device, and therefore must already be supplied with an activated screwing system (parts already partially screwed) and adapted to this locking function, making the production of the entire system expensive.

PURPOSE AND OBJECT OF THE INVENTION

It is the object of the present invention to provide a system for the concomitant administration and heating of liquids, including, but not limited to, breast milk or reconstituted powdered milk, which solves the problems and overcomes the drawbacks of the background art.

It is the specific object of the present invention to provide a system of the above type, which allows the regulation, in particular, of the actual administration temperature of a liquid, so as to allow the user (for example the caregiver of a newborn) to regulate the temperature of the liquid according to their needs, as well as in relation to the age and the psycho-physical needs of the recipient.

It is also a specific object of the present invention to provide a system for the concomitant administration and heating of liquids which is practical, easy to handle and/or hygienic and/or sterile and/or easily sanitized/sterilized.

A subject-matter of the present invention is a device for the concomitant heating and administration of liquid according to the appended claims.

A specific subject-matter of the present invention is also a liquid container (preferably pre-packaged) configured and adapted to be used with the device according to the invention, as defined in the appended claims.

A further specific subject-matter of the present invention is a method of concomitant heating and administration of a liquid, which uses the device and the container according to the invention, as defined by the appended claims.

BRIEF DESCRIPTION OF THE FIGURES

The invention will now be described by way of example, with particular reference to the drawings of the accompanying figures, in which.

It is worth noting that hereinafter elements of different embodiments may be combined together to provide further embodiments without restrictions respecting the technical concept of the invention, as a person skilled in the art will effortlessly understand from the description.

Although the figures illustrate a baby bottle, the device according to the invention has general features which also allow different implementations.

The present description also refers to the background art for the implementation thereof, with regard to the detail features not described, such as elements of minor importance usually used in the background art in solutions of the same type.

When an element is introduced it is always understood that there may be "at least one" or "one or more".

When a list of elements or features is given in this description it is understood that the invention according to the invention "comprises" or alternatively "consists of" such elements.

In this description, the terms upper and lower mean the portions which are higher or lower with respect to the force of gravity, of the device resting on a plane perpendicular to the force of gravity with the base thereof opposite the teat (administration means), therefore "low" or "lower" is closer to the plane and "high" or "upper" is farther from the plane. These definitions also apply to the liquid container as positioned inside the device.

DETAILED DESCRIPTION

Figure 1:
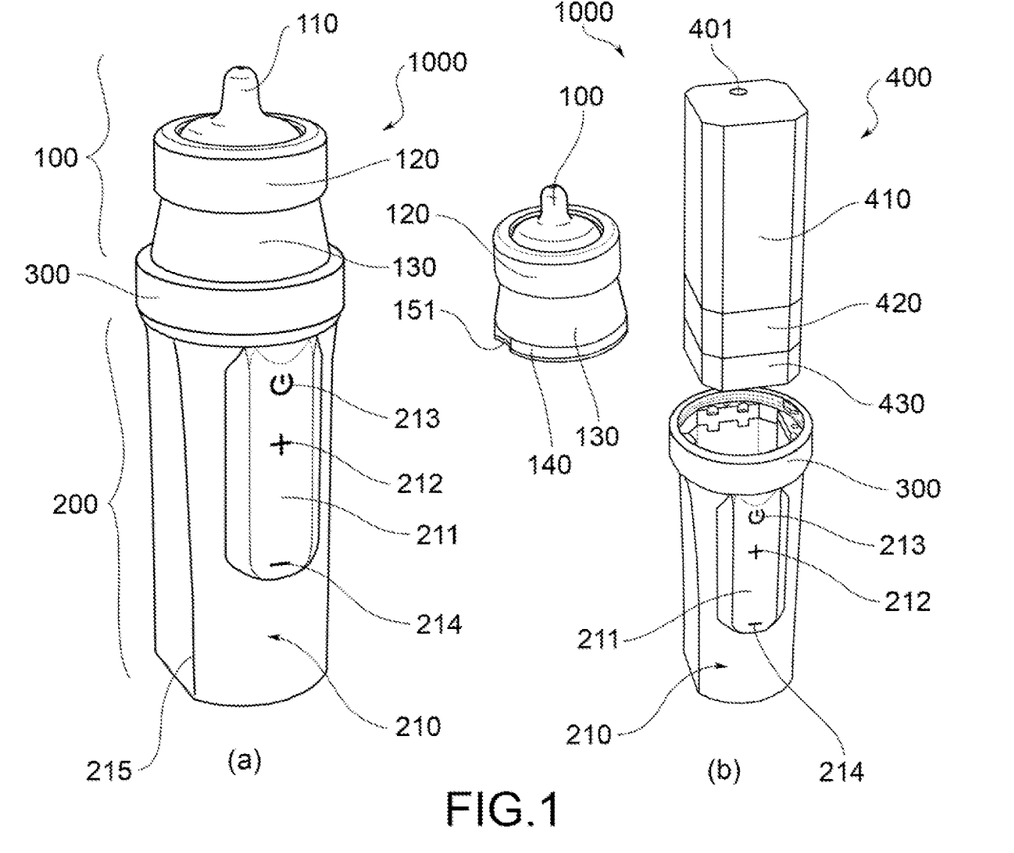
FIG. 1 shows in (a) a perspective view of the assembled device and in (b) of the disassembled device, according to an embodiment of the invention.

Referring to FIG. 1, the device 1000 for the administration of a liquid according to an embodiment comprises a device lower portion 200 and a device upper portion 100 as well as removable locking means 300 configured to pass, in use, from a mechanical locking position to a mechanical release position between said lower portion 200 and said upper portion 100.

Thereby, the upper 100 and lower 200 portions can be released for cleaning and refilling.

With regard to refilling, the lower portion 200 comprises a casing 210 configured to receive a pre-packaged liquid container (cartridge) 400 through an end opening thereof (it is intended in the present description and in the claims that the pre-packaged liquid container is also only partially filled with liquid, for example it can be filled with liquid and powder, to be mixed). Although hereinafter an opening of the casing is shown at one end thereof, which engages with the means 300, the opening can also be at the opposite end. In this latter case, closing means other than the means 300 can be provided.

A screen 211, a switching on key 217, a temperature increase key 218 and a temperature decrease key 219, connected to the heating control means described below, can be placed on the outer wall of the casing 210.

Figure 2:
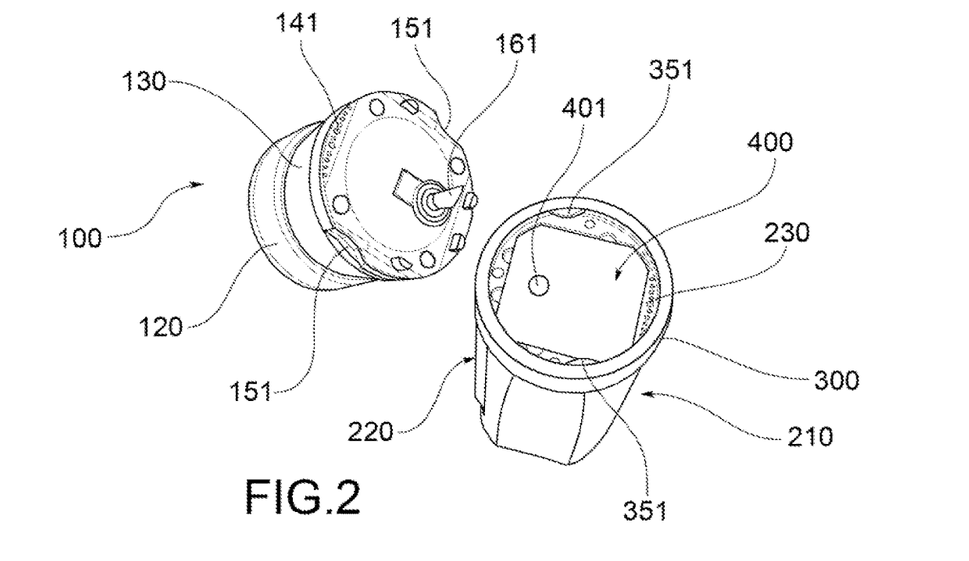
FIG. 2 shows a perspective view from above of the device in FIG. 1 disassembled, in which the upper part is seen from the bottom.

Referring also to FIG. 2, the upper portion 100 comprises:
fluidic connection means 160 configured to fluidically connect, in said mechanical locking use position, the device upper portion 100 to said pre-packaged container 400 inside said casing 210;
induction heating means 173, 174 for heating said liquid fluidically connected (see below for details) to said fluidic connection means 160 and configured to obtain a heated liquid;
means 110 for the administration of said heated liquid, for example a teat.

In particular, in FIG. 2, a sharp spout 161 is seen, part of the fluidic connection means 160, configured and adapted to perforate a corresponding perforable portion 401 of the container 400. According to an aspect of the invention, the removable locking means 300 are configured so as to push or tighten, in use, said pre-packaged liquid container 400 against one or more sharp spouts 161 up to the perforation thereof (in the case of several spouts 161, there will be multiple perforable areas 401).

Further, contacts 230 can be noted in the lower portion 200 corresponding to the contacts 141 of the upper portion, configured and adapted to the passage of energy and signals between the two parts, in particular energy from the battery 220 coupled to an outer side of the casing 210.

Furthermore, the upper part 100 can be composed of a base 140, on which the aforementioned contacts 141 are present, a neck 130 where the induction heating means, the administration means (teat) 110 are housed, and a locking ring nut 120 between the neck and the administration means. Between the neck 130 and the base 140 there are also elements for coupling 151 to the lower portion 200 through engagement with the locking means 300, in particular with corresponding elements 351.

Figure 3:
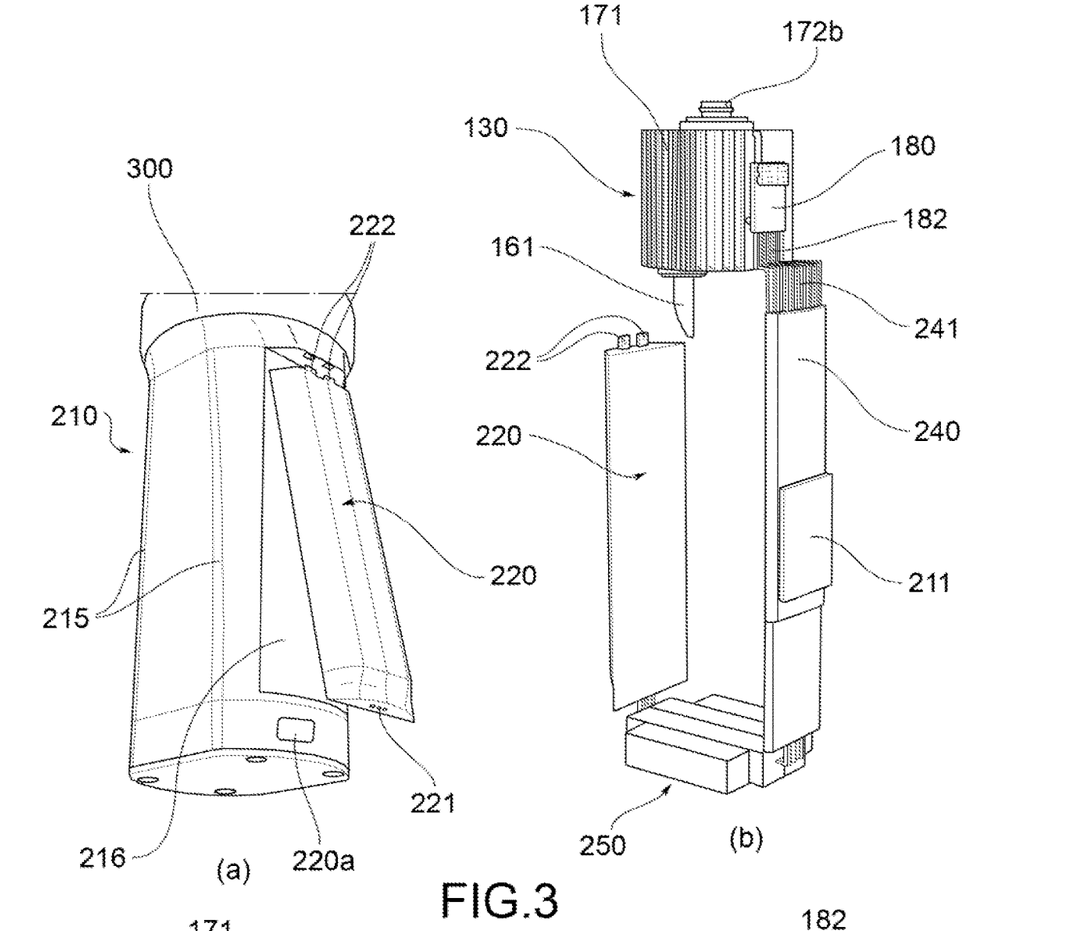
FIG. 3 shows in (a) a detail of the positioning of the battery in the lower part of the device, and in (b) the battery control, temperature control, and wiring sections of the device according to an embodiment of the present invention.

Referring now to FIG. 3, in (a) the casing 210 is seen in perspective from below, with the battery 220 half-released, in which the contacts 221 and the battery coupling teeth 222 can be noted, which battery can thus be inserted into a suitable seat 216 outside the casing 210. Preferably, there is a connector 220A on the casing 210 for charging from a fixed network, for example a USB-C connector. Such a connector can also be useful for connecting to internal control logics for maintenance purposes.

Two LED strips 215 are also visible (and two other strips on the opposite side (not visible), in general at least one LED) to signal the position of the administration device (or also, in general, other functions including for example signaling that the device is ready for use, or in an error state). In drawing (b) of the same figure, the casing 210 is instead removed. The battery 220 can be noted connected with battery management means 250, in turn connected with electrical connections 241 which can slide inside a seat 240 for a good part of the length thereof. A display device 211 for displaying information to the user is also shown. The electrical connections 241 connect to corresponding connections 182 which end on a chipset 180 for managing the heating means, of which only the energy dissipating means 171 can be seen. The final outlet 172B for the heated liquid before reaching the administration means should also be noted.

Behind the contacts 211, there is the whole-system management chipset 240, which controls both the heating means management chipset 180 and the battery management chipset 250, as well as providing the Bluetooth and/or NFC and/or RFID connection with external control devices such as a smartphone.

Figure 4:
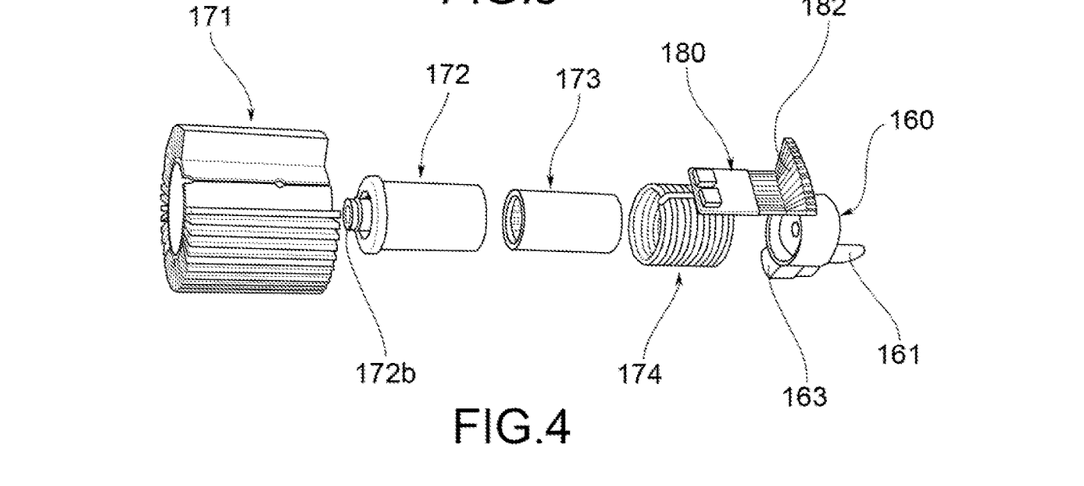
FIG. 4 shows an exploded view of the inner components of the upper portion of the device in FIG. 1.

Referring now to FIG. 4, according to an embodiment of the present invention, the induction means 173, 174 comprise a metal cylinder 173 including a plurality of through ducts 173A (seen in FIG. 5) configured for the passage of said liquid, surrounded by an induction winding 174. Preferably, between the winding 174 and the metal cylinder (or "cannula") 173, there is a container 172 with an outlet spout 172B for the heated liquid. The figure also shows the heat dissipating means 171 preferably placed around the container 172, as well as the control means (chipset) 180.

According to an aspect of the invention, a first temperature sensor (not shown) is comprised, positioned inside the fluidic connection means 160 upstream (in the chamber 163) of said metal cylinder 173 and a second temperature sensor (not shown) is comprised, positioned downstream of said metal cylinder 173 (at or near the spout 172B or between this and the administration means) along the flow direction of the liquid, in use, and in which in said upper portion 100 an electronic temperature control unit 180 is comprised, which is configured to activate the induction heating means 173, 174 based on the data detected by said first and by said second temperature sensor, and/or based on the temperature set by the user by means of the aforesaid keys 214 and 212, or by means of an app on a mobile device (not shown) which wirelessly connects with the chipset 240. The activation of the heating means can also occur additionally based on data from a sensor (not shown) configured and adapted to quantify the volume of liquid passing through and therefore dispensed: the system heats if it senses the passage of fluid, in addition to detecting the inclination with the accelerometer.

According to a further independent and combinable aspect of the invention, the temperature control unit 180 is configured to activate the induction heating means 173, 174 based on data detected by an accelerometer provided in said device 1000. This allows for example to activate the heating when the baby bottle is completely or partially overturned for administration.

Figure 5:
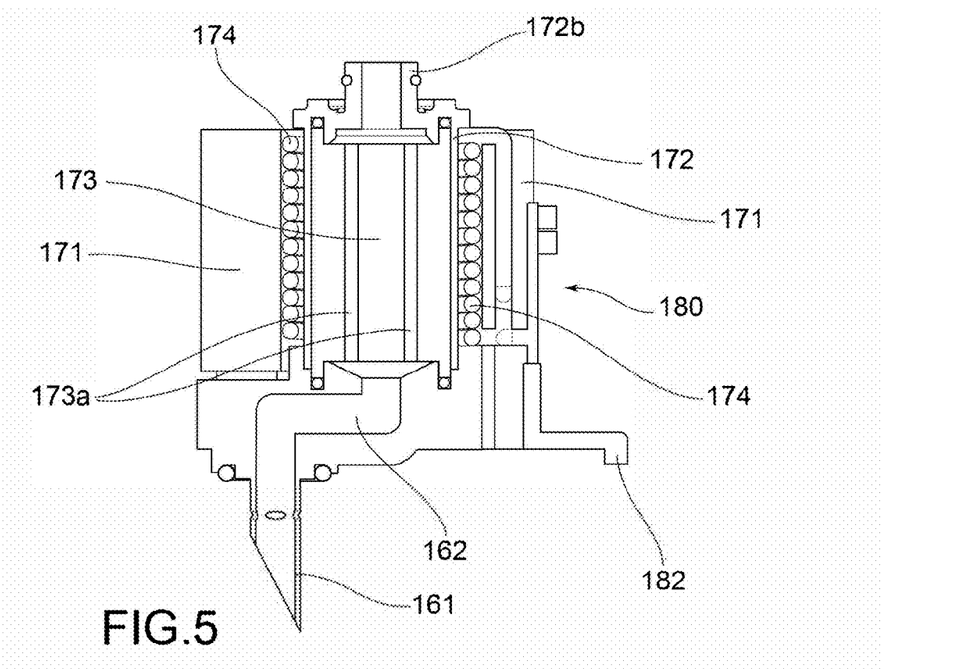
FIG. 5 shows a section of the upper portion of the device in FIG. 1.

Referring to FIG. 5, the above can be seen, in section, with the detail of the double elbow tube, according to a preferred variant, which connects the sharp spout 161 to the rest of the fluidic connection means 160.

Figure 6:
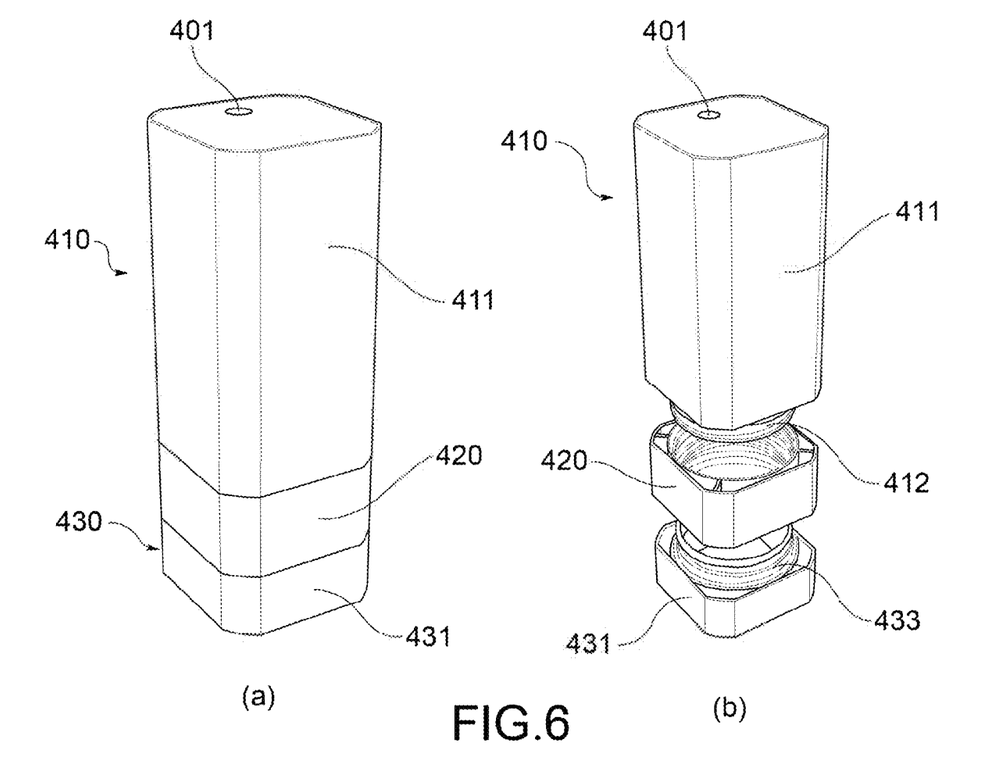
FIG. 6 shows in (a) a perspective view of the container and in (b) an exploded perspective view of the same container, according to an embodiment of the present invention.
Figure 7:
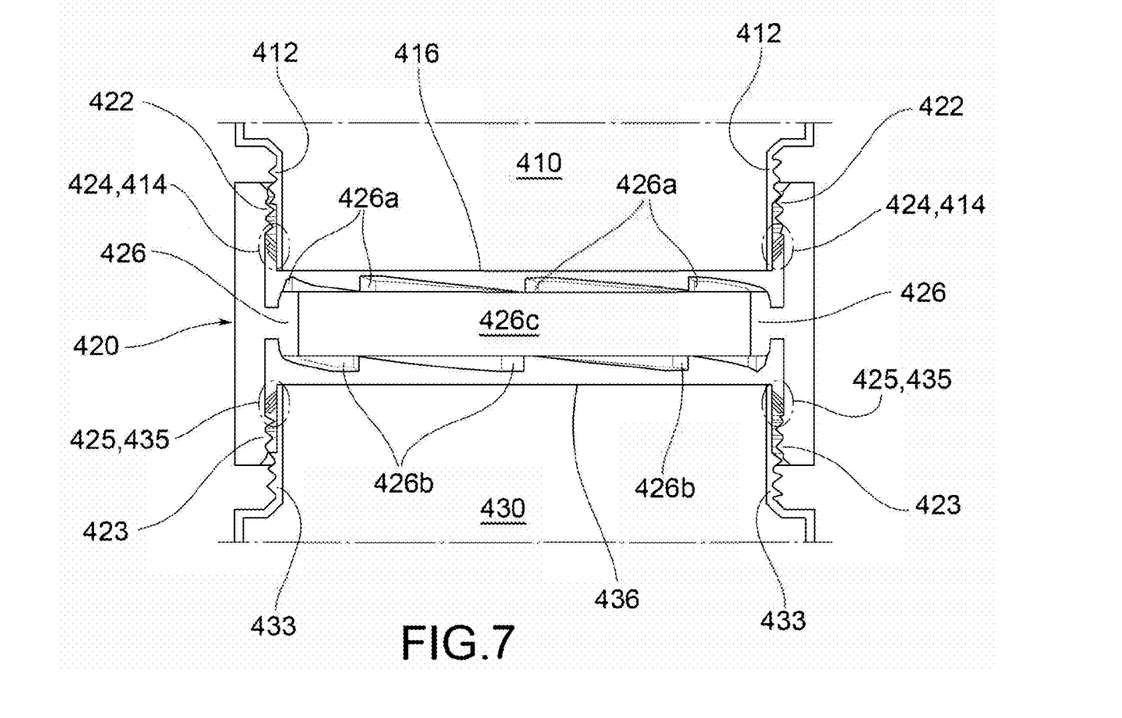
FIG. 7 shows a section of the container in FIG. 6 at the level of the connection means between the upper and lower portion, in a non-operated state.
Figure 8:
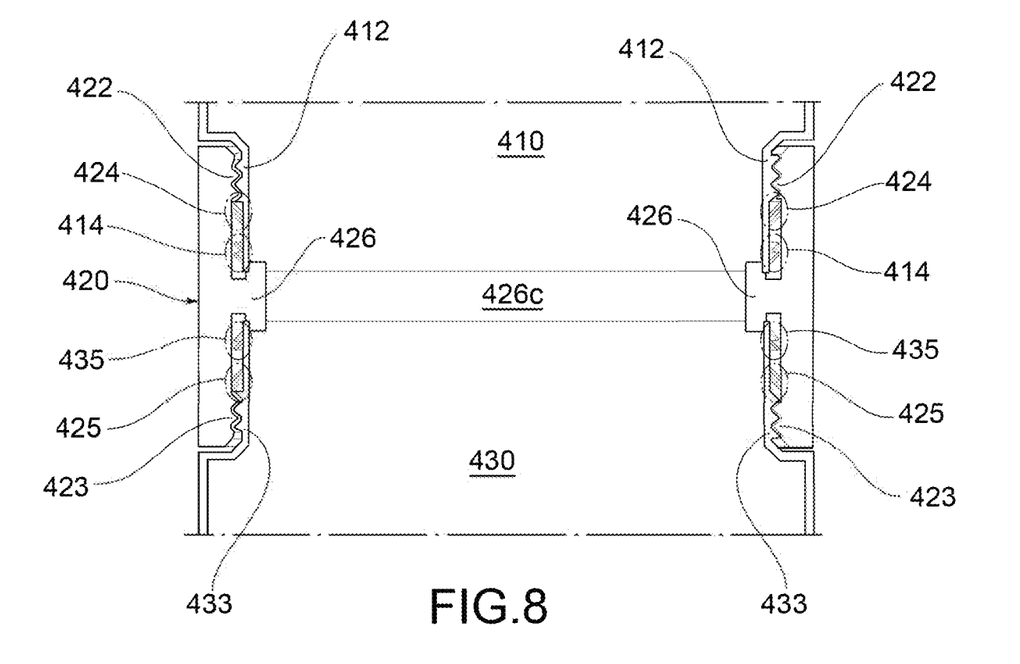
FIG. 8 shows a section of the container in FIG. 6 at the level of the connection means between the upper and lower portion, in an operated state.

With regard to the container 400 of the invention, and with reference to FIGS. 6-8, it comprises:

a container upper portion 410 with a container upper wall 411 extending from a first base to a second container upper portion base, forming a container upper chamber configured to contain a basic liquid, and in which:
  said wall 411 comprises, close to said second container upper portion base, an upper thread 412;
  said second container upper portion base comprises a mechanically breakable container upper portion membrane 416;
a container lower portion 430 with a container lower wall 431 extending from a first container lower portion base to a second container lower portion base, forming a container lower chamber configured to contain a powder soluble in said basic liquid, and in which:
  said lower wall 431 comprises, close to said first container lower portion base, a container lower portion thread 433;
  said first container lower portion base comprises a mechanically breakable container lower portion membrane 436;
coupling and closing means 420 of said upper 410 and lower 430 portions positioned, in use, with said container upper portion membrane 416 facing said container lower portion membrane 436, comprising:
  a first thread 422 configured to engage with said container upper portion thread 412;
  a second thread 423 configured to engage with said container lower portion thread 433;
  breaking means 426, 426A, 426B of said container lower portion membrane 436 and of said container upper portion membrane 416 upon screwing (preferably simultaneous) of said first 422 and second 423 threads on said container upper 412 and lower 433 portion threads.

The expression "close to" should be understood in the sense of greater proximity to one end with respect to the other, for example the coupling point of the thread with respect to the counter-thread on the element to which it is coupled.

Furthermore, the expression breakage by screwing also includes the case in which there is a pre-screwing (of positioning) which does not cause breakage.

Figure 9:
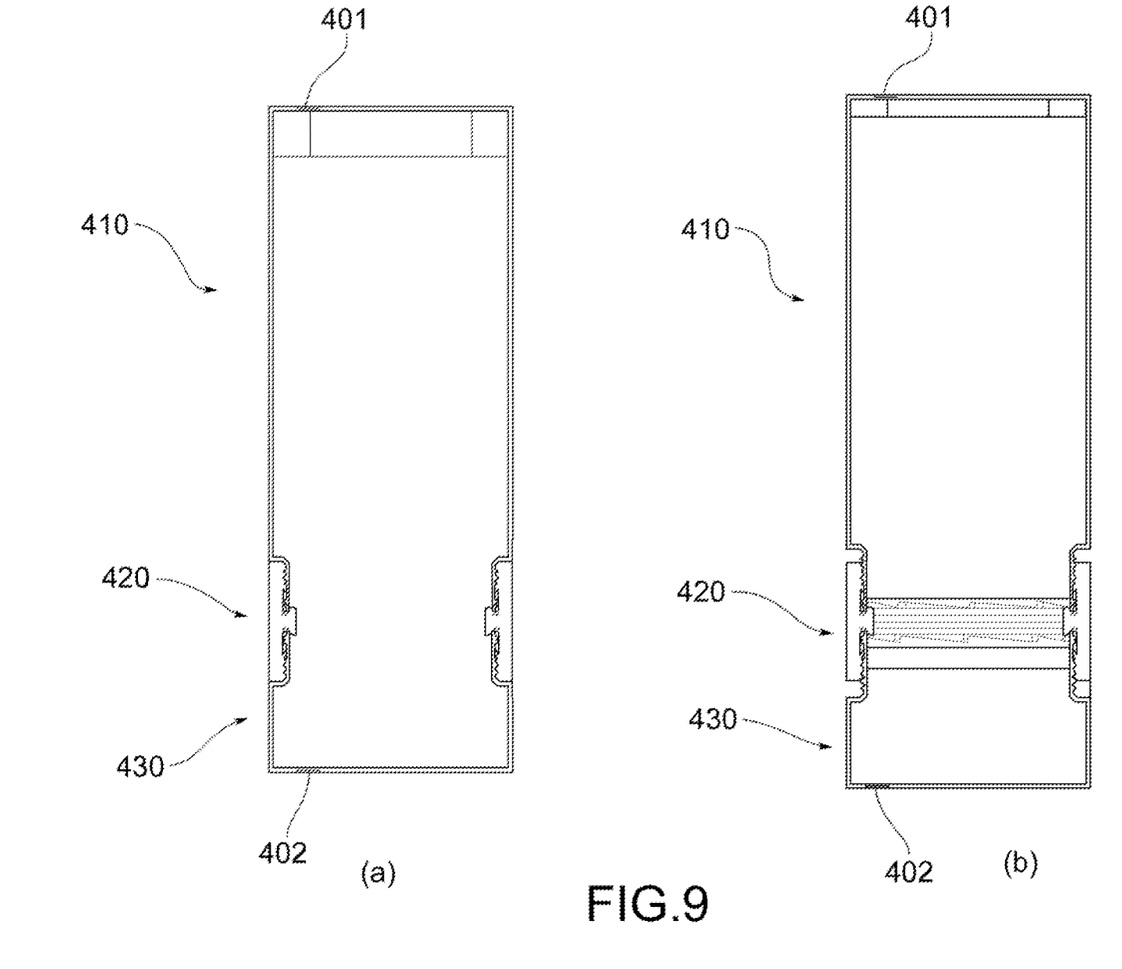
FIG. 9 shows the cartridge of the preceding figures in (a) an operated state and in (b) a non-operated state.

In this configuration, as also mentioned above, the container upper portion 410 comprises one or more container fluidic connection means 401 (on the first base) configured and adapted to connect with said fluidic connection means 160, 161 (for perforating with the spout 161), respectively. In a different configuration, instead of or additionally to the fluidic connection means 401, similar or equal fluidic connection means 402 are placed on the second container lower base, as shown in FIG. 9, the second base being the base opposite to that of the container on which the means 401 are placed. In this configuration, the container will be inserted into the administration device in the opposite direction to that of the previous configuration, in order to match the fluidic connection means 402 with the sharp spout 161. If both elements 401 and 402 (perforable regions) are present, the cartridge 400 can have any orientation inside the administration device.

The elements 401 and/or 402 can have appropriate peripheral pre-perforations (not shown).

Preferably, the breaking means comprise a circular series of upper teeth 426A configured to break said container upper portion membrane 416 and a circular series of lower teeth 426B configured to break said container lower portion membrane 436. Within such circular series, a void 426C is formed, in practice the interior of a ring on which the teeth are placed.

According to an aspect of the invention, in order to avoid tampering with the container 400, with removal of the upper part or the lower part in the axial direction, safety means can be included which oppose a removal force and in any case show that tampering has occurred. Preferably, such safety means take the form of pairs of tabs (circular or only along one or more arcs of circumference following the ring 426) on the means 420 and correspondingly on the upper portions 410 and 430. In particular there is a pair of tabs 424 on the means 420 positioned and configured to engage with a corresponding pair of tabs 414 on the upper portion 410, and a pair of tabs 425 positioned and configured to engage with a corresponding pair of tabs 435 on the lower portion 430. The engagement consists of a tab of one pair being inside the space between the tabs of the corresponding pair. To this end, with respect to the axial screwing direction (direction of axial symmetry of the ring 426, which goes from the lower portion to the upper portion), the tabs 414 projecting from the upper portion preferably form an acute angle, while the corresponding tabs 424 projecting from the central portion preferably form a complementary obtuse angle of 180° with respect to said acute angle. The tabs 435 and 425 which oppose removal (force opposite the axial direction) of the lower part 430 have opposite angles to the corresponding tabs which oppose removal of the upper part (force in the axial direction). The angles thus described allow a better disengagement of the tabs upon screwing the two parts of the container, especially if the tabs are not made of rigid material, or of a material with such an elasticity as to prevent them from distancing but not so excessive as to not allow disengagement.

The tabs are anti-tampering means which prevent the two parts of the container from becoming accessible before screwing and therefore before use, thus also avoiding the involuntary contamination of the contents. The tab system also allows to use less extended and stronger threads.

The tabs are generally parallel to each other, protruding with respect to the walls to which they are fixed and parallel to each other, forming a non-zero angle with respect to the longitudinal axis of the container, in particular an acute angle with respect to the screwing direction of each part. If the tabs run only for an arc of circumference, they can be in several points of said arc, symmetrically or not with respect to the longitudinal axis of the container. In general, the length of the tabs is the same for all, but it can also be different depending on constructional convenience, so as to ensure the operation thereof.

The tabs can be placed after the threads towards the membranes, so that with the screwing they pass from an engagement position (FIG. 7) to a disengagement position (FIG. 8).

FIG. 9 provides a full vertical sectional depiction of the container before (in (b)) and after (in (a)) breaking.

After the breaking of the membranes, the container for mixing the basic liquid 410 and a soluble powder 430 can be shaken, or the cartridge can be inserted into the device 1000 and shaken, or overturned so that the powder and basic liquid mix.

The container can be in Tetrapak®, in which for example the perforable wall portions 401 do not have the cardboard covering of the Tetrapak®.

According to an aspect of the present invention, the device and the container described above are used by performing the following steps:

C. operating the coupling and closing means 420 of said pre-packaged liquid container 400 up to the perforation of said container upper 416 and lower membranes 436;

D. inserting said pre-packaged liquid container 400 into said liquid administration device lower portion 200 so that said container fluidic connection means 401 face said device upper portion 100;

E. coupling said upper portion 100 to said lower portion 200 of said liquid administration device 1000 so as to fluidically connect said pre-packaged liquid container 400 to said liquid administration device upper portion 100, by means of the ring nut 300;

F. activating said liquid heating means 173, 174; and

G. administering said liquid through said administration means 110.

Advantages of the Invention

The solution proposed according to the present invention solves the problem of managing the dosage and raising the temperature of the liquid, allowing the user a personalized regulation of the thermal features of the liquid in relation to the recipient (newborn) and to simplify the moment of dosage through one or more pre-filled cartridges and therefore to adapt them to the particular conditions and needs of the recipient and the context of use in which the administrator operates.

The solution therefore allows the use of one or more pre-filled cartridges during the baby bottle preparation step. Such cartridges can be sold separately from the rest of the system.

By virtue of the solution of the present description, the thermal features of the baby bottle can be regulated remotely by means of a device (smartphone or the like) and a dedicated App.

With respect to the device of document U.S. Pat. No. 5,397,031, the invention allows to integrate the water heater with the baby bottle so that the whole is manageable and sterile. Moreover, the document of the background art describes separate elements for heating and administration, since the passage of pure water does not require sanitation, and the baby bottle is instead sanitized separately in a classic manner.

Furthermore, the device of the prior art does not have an inner housing configured to receive and enclose (e.g., completely) a liquid container, instead presenting itself as a support for a water bottle in an overturned position. This makes the device scarcely manageable, contrary to the present invention. Even if the connection was previously made in a position with the bottle resting on a support, it would still have poor handling. With the device according to the invention, the container of liquid to be administered can be inserted in any position, as it is intended to be closed inside the device itself. This avoids any contamination and any spillage during use.

Furthermore, the bottle of water is classically connected through the integrated opening thereof, while in the invention the container has no openings up to the perforation with a sharp spout present inside the device. This obliges the user of the background art to open the bottle before connecting it to the heater, while in the invention the opening and the connection are simultaneous, limiting or canceling the exposure of the liquid to the agents of the surrounding environment. The perforation of the present invention does not create the possibility of contamination because it occurs after removing a protective tab placed on the perforation area during the container production step. The sanitation of the sharp spout occurs by detaching the neck from the body of the baby bottle and using, for example, the sanitation device according to the invention. Finally, with the device according to the invention it is not necessary to prepare the milk before administration, heating it completely, but it is heated as it is administered, so as to save energy.

The invention thus avoids the need for the body of the baby bottle to be manually filled with milk from an external source, and avoids the time required to couple the baby bottle body to the heating module and finally the latter to the suction means. Furthermore, the invention includes, for the sterilization of the device pre- or post-use, a disassembly in two parts, making the present solution much more practical as well as sterile.

Finally, the pre-packaged container (cartridge) allows water (or other basic liquid) and powdered milk (or other soluble powder) to be kept separate until actual use, thus prolonging the conservation and usability of the cartridge. Optionally, the presence of a peel-off (not shown) can also be included at the point where the cartridge is pre-perforated, for further protection before the membrane 401 and/or 402.

LIST OF REFERENCE NUMERALS IN THE DRAWINGS

- 1000=Liquid administration device
- 100=Device upper part
- 200=Device lower part
- 300=Ring nut/flange for mutual fastening of the upper part 100 and lower part 200 of the liquid administration device
- 110=teat or other administration means
- 120=Teat locking ring nut on the neck 130
- 130=Neck of the upper part 100 of the liquid administration device
- 140=Base of the upper part 130
- 141=Electrical contacts on the base 140
- 151=Locking elements (recesses) of the upper part 100 to the ring nut 300
- 160=Fluidic connection to the container 400
- 161=Sharp spout of the fluidic connection 160
- 162=Tube (double elbow) from the spout 161 to the connection with the cannula 173
- 163=Liquid passage chamber with possible temperature and optionally flow sensor, in the fluidic connection 160
- 171=Heat dissipator
- 172=Cannula container
- 172B=Cannula container outlet duct
- 173=Metal cannula with through ducts for the liquid
- 173A=Through ducts inside the cannula 173
- 174=Induction winding
- 180=Liquid temperature control chipset (energy management of the induction system)
- 182=Electrical connections from the chipset 180 to the lower part 200
- 210=Casing of the device lower part 200
- 211=Display screen integrated in the casing 210
- 212=Key to increase the temperature
- 213=Key for switching on, switching off and activating connection with smartphone or other device.
- 214=Key to decrease the temperature
- 215=Light strips (LED)
- 216=Battery seat 222 in the casing 210
- 220=Removable battery
- 221=Battery electrical contacts
- 222=End teeth for battery interlocking
- 230=Electrical contacts for the wiring of the lower part 200, corresponding to the contacts 141 of the upper part 100
- 240=General control chipset of the administration device including the means 250 and 180
- 241=Electrical connections (cables) inside the lower portion 200
- 250=Control means (chipset) of the battery 220
- 300=Locking means between the upper part 100 and the lower part 200
- 351=Elements (protrusions) for coupling to the upper part 100, in particular to the recesses
- 400=Pre-packaged liquid container
- 401=Portion (membrane) of the container 400, perforable through the sharp spout 161
- 402=Portion (membrane) of the container 400, at the opposite end with respect to 401, perforable through the sharp spout 161
- 410=Container upper part, for liquids
- 411=Upper portion side wall 410
- 412=Upper part end inner thread 410
- 414=Pair of safety tabs of the upper part 410, below the thread 412
- 416 Breakable membrane of the end (facing the system 420) of the upper part 410
- 420=Breaking and locking system upper 410 and lower 430 part
- 422=Breaking and locking system thread, upper part side 410
- 423=Breaking and locking system thread, lower part side 430
- 424=Pair of safety tabs of the breaking and locking system 420 on the upper part side 410, below the thread 422
- 425=Pair of safety tabs of the breaking and locking system 420 on the lower part side 430, above the thread 423
- 426=Annular breaking system
- 426A=Breaking upper teeth of the annular breaking system 426
- 426B Breaking lower teeth of the annular breaking system 426
- 426C=Void inside the annular breaking system
- 430=Container lower portion, for powder
- 431=Lower portion side wall 430
- 433=Lower part end inner thread 430
- 435=Pair of safety tabs of the lower part 430, above the thread 433
- 436=Lower part end breakable membrane 430

The preferred embodiments and possible variants of the present invention have been outlined above, but it is to be understood that those skilled in the art may make modifications and changes without thereby departing from the scope of protection, as defined in the appended claims.

The invention claimed is:

1. A pre-packaged liquid container usable in a device for administration of a liquid, the pre-packaged liquid container comprising:
a container upper portion with a container upper wall extending from a first container upper portion base to a second container upper portion base, the container upper portion being configured to contain a basic liquid, and wherein:

said container upper wall comprises, close to said second container upper portion base, a container upper portion thread and a container upper portion without thread;

said second container upper portion base comprises a mechanically breakable container upper portion membrane;

a container lower portion with a container lower wall extending from a first container lower portion base to a second container lower portion base, the container lower portion being configured to contain a powder soluble in said basic liquid, and wherein:

said container lower wall comprises, close to said first container lower portion base, a container lower portion thread and a container lower portion without thread;

said first container lower portion base comprises a mechanically breakable container lower portion membrane;

coupling and closing means of said container upper and lower portions positioned, in use, with said container upper portion membrane facing said container lower portion membrane, the coupling and closing means comprising:

a first coupling and closing means wall comprising a first thread configured to engage with said container upper portion thread and a first coupling and closing means wall without thread;

a second coupling and closing means wall comprising a second thread configured to engage with said container lower portion thread and a second coupling and closing means wall without thread;

breaking means configured to break said container lower portion membrane and said container upper portion membrane upon screwing, in use, said first and second threads on said container upper and lower portion threads;

and wherein said container upper portion and/or said container lower portion comprise one or more container fluidic connection means connectable with fluidic connection means of said device;

the pre-packaged liquid container further comprising a system of safety tabs, wherein:

the system of safety tabs comprises at least two first pairs of safety tabs fastened on said coupling and closing means, a first pair of safety tabs of the at least two first pairs of safety tabs being placed after the first thread towards said upper portion membrane on the first coupling and closing means wall without thread and a first pair of safety tabs of the at least two first pairs of safety tabs being placed after the second thread towards said lower portion membrane on the second coupling and closing means wall without thread and at least two second pairs of safety tabs, a second pair of safety tabs of the at least two second pairs of safety tabs being fastened on said container upper portion without thread and a second pair of safety tabs of the at least two second pairs of safety tabs being fastened on said container lower portion without thread at heights corresponding to those of the at least two first pairs of safety tabs, one of the two tabs in each of said at least two first pairs of safety tabs is inserted between two corresponding tabs of said at least two second pairs of safety tabs, or one of the two tabs in each of said at least two second pairs of safety tabs is inserted between the two corresponding tabs of said at least two first pairs of safety tabs, so that all the tabs are substantially parallel, the at least two first pairs of safety tabs and the at least two second pairs of safety tabs are each oriented along a direction that forms an acute turning angle with a corresponding screwing direction of said container upper portion thread and said container lower portion thread, the at least two first pairs and two second pairs of safety tabs are configured to exert a resistance against removal, in an axial screwing direction, of said container upper and/or lower portions from said coupling and closing means before screwing.

2. The pre-packaged liquid container of claim 1, wherein said breaking means comprise a circular series of upper teeth configured to break said container upper portion membrane and a circular series of lower teeth configured to break said container lower portion membrane.

3. The pre-packaged liquid container of claim 1, wherein the at least two first pairs of safety tabs and the at least two second pairs of safety tabs run for at least one arc of circumference around an axis of said first and second threads or of said container upper or lower portion threads.

* * * * *